US011419267B2

(12) United States Patent
Oberlander et al.

(10) Patent No.: US 11,419,267 B2
(45) Date of Patent: Aug. 23, 2022

(54) AUGER WITH RETRACTABLE FINGERS AT COMBINE FEEDER

(71) Applicant: CNH Industrial America LLC, New Holland, PA (US)

(72) Inventors: Joseph Neil Oberlander, Durant, IA (US); Herbert M. Farley, Elizabethtown, PA (US); Dan Lawrence Garland, Solon, IA (US); Mark D. Dilts, New Holland, PA (US)

(73) Assignee: CNH Industrial America LLC, New Holland, PA (US)

(*) Notice: Subject to any disclaimer, the term of this patent is extended or adjusted under 35 U.S.C. 154(b) by 229 days.

(21) Appl. No.: 16/527,737

(22) Filed: Jul. 31, 2019

(65) Prior Publication Data

US 2020/0037502 A1  Feb. 6, 2020

Related U.S. Application Data

(60) Provisional application No. 62/712,430, filed on Jul. 31, 2018.

(51) Int. Cl.
*A01D 41/14* (2006.01)
*A01D 41/06* (2006.01)

(52) U.S. Cl.
CPC ............ *A01D 41/14* (2013.01); *A01D 41/06* (2013.01)

(58) Field of Classification Search
CPC ...... A01D 41/14; A01D 41/06; A01D 61/008; A01D 47/00
See application file for complete search history.

(56) References Cited

U.S. PATENT DOCUMENTS

| | | | | |
|---|---|---|---|---|
| 2,548,329 A | * | 4/1951 | Van Sickle | A01D 89/002 56/364 |
| 2,557,226 A | * | 6/1951 | Johnson | A01D 61/008 460/113 |
| 2,612,980 A | * | 10/1952 | Ochler | A01D 61/008 198/513 |
| 2,644,292 A | * | 7/1953 | Oberholtz | A01F 12/12 56/364 |
| 2,701,634 A | * | 2/1955 | Carroll | A01D 61/008 198/518 |
| 2,706,032 A | | 4/1955 | Kowalik | |
| 2,711,244 A | * | 6/1955 | Hyman | A01D 61/008 198/522 |

(Continued)

FOREIGN PATENT DOCUMENTS

| | | | | |
|---|---|---|---|---|
| CA | 3077283 A1 | * | 11/2020 | ........... A01D 61/002 |
| CN | 112772126 A | * | 5/2021 | ............ A01D 47/00 |

(Continued)

OTHER PUBLICATIONS

Extended European Search Report for EP Application No. 19188921.1 dated Jan. 3, 2020 (six pages).

*Primary Examiner* — Arpad Fabian-Kovacs
(74) *Attorney, Agent, or Firm* — Peter Zacharias; Patrick Sheldrake (57) ABSTRACT

A header of a combine harvester includes an auger for directing a movement of harvested crop material toward a feederhouse of the combine harvester. The auger includes multiple protrusions configured to both extend from and retract into the auger during rotation of the auger to assist movement of the harvested crop material toward the feederhouse.

19 Claims, 6 Drawing Sheets

(56) References Cited

U.S. PATENT DOCUMENTS

| | | | | |
|---|---|---|---|---|
| 2,748,921 | A * | 6/1956 | White | A01D 89/002 198/518 |
| 2,778,483 | A * | 1/1957 | Nikkel | A01D 61/008 198/494 |
| 2,832,187 | A * | 4/1958 | Johnson | A01D 41/1252 56/207 |
| 2,849,103 | A * | 8/1958 | Scheffter | A01D 61/008 198/513 |
| 2,867,958 | A | 1/1959 | Allen | |
| 2,895,590 | A * | 7/1959 | Snow | A01D 61/008 198/513 |
| 2,934,881 | A * | 5/1960 | Noble | A01D 61/008 56/158 |
| 3,411,615 | A * | 11/1968 | Schwalm | A01D 89/002 198/518 |
| 3,511,362 | A * | 5/1970 | Gaeddert | A01D 89/002 198/693 |
| 3,545,185 | A * | 12/1970 | Dorsett | A01D 29/00 56/14.6 |
| 4,038,809 | A | 8/1977 | Arnould et al. | |
| 4,161,859 | A * | 7/1979 | Storm | A01D 89/002 56/364 |
| 4,271,956 | A * | 6/1981 | Hutchinson | B65G 65/22 198/613 |
| 4,453,375 | A * | 6/1984 | Field | A01D 89/002 56/14.6 |
| 4,539,801 | A * | 9/1985 | Field | A01D 61/008 198/613 |
| 4,663,921 | A * | 5/1987 | Hagstrom | A01D 41/02 56/14.6 |
| 4,970,849 | A * | 11/1990 | Friesen | A01D 41/10 56/12.4 |
| 5,293,730 | A | 3/1994 | Bich et al. | |
| 5,620,083 | A * | 4/1997 | Vogelgesang | A01D 61/008 198/613 |
| 5,768,868 | A * | 6/1998 | Stein | A01D 41/142 56/14.5 |
| 5,813,205 | A * | 9/1998 | Gosa | A01D 61/008 56/341 |
| 6,430,904 | B1 | 8/2002 | Coers et al. | |
| 6,640,527 | B2 * | 11/2003 | Farley | A01D 61/008 56/12.4 |
| 6,668,534 | B2 * | 12/2003 | Sheedy | A01D 61/008 56/12.4 |
| 6,986,241 | B2 * | 1/2006 | Beck | A01D 61/008 56/12.4 |
| 7,392,646 | B2 * | 7/2008 | Patterson | A01D 61/008 198/613 |
| 7,587,885 | B2 | 9/2009 | Tippery et al. | |
| 7,669,396 | B2 * | 3/2010 | Eagles | A01D 61/002 56/153 |
| 7,866,136 | B1 * | 1/2011 | Hill | A01D 57/20 56/364 |
| 7,937,921 | B2 * | 5/2011 | Lohrentz | A01D 61/004 56/294 |
| 8,156,723 | B1 * | 4/2012 | McClure | A01F 15/106 56/364 |
| 8,261,524 | B1 * | 9/2012 | McClure | A01D 89/002 56/364 |
| 9,392,747 | B2 | 7/2016 | Patterson et al. | |
| 10,117,383 | B2 * | 11/2018 | Lagaese | A01D 57/00 |
| 10,806,081 | B2 * | 10/2020 | Eyestone | A01D 57/20 |
| 2002/0025840 | A1 | 2/2002 | Beck | |
| 2004/0148919 | A1 * | 8/2004 | Dunn | A01D 57/20 56/16.4 R |
| 2005/0016147 | A1 * | 1/2005 | Patterson | A01D 41/14 56/181 |
| 2005/0284124 | A1 * | 12/2005 | Patterson | A01D 61/006 56/364 |
| 2008/0098705 | A1 * | 5/2008 | Salley | A01D 41/06 56/16.4 R |
| 2009/0050447 | A1 * | 2/2009 | Eagles | A01D 61/002 198/625 |
| 2009/0056298 | A1 * | 3/2009 | Lohrentz | A01D 89/005 56/364 |
| 2009/0217639 | A1 * | 9/2009 | Lohrentz | A01D 61/004 56/364 |
| 2010/0212277 | A1 * | 8/2010 | Marrs | A01D 61/004 56/12.4 |
| 2016/0324071 | A1 | 11/2016 | Wenger et al. | |
| 2019/0200525 | A1 * | 7/2019 | MacMillan | A01D 61/006 |
| 2019/0313581 | A1 * | 10/2019 | Sorensen | A01D 61/008 |

FOREIGN PATENT DOCUMENTS

| | | | | |
|---|---|---|---|---|
| EP | 0933017 | A1 * | 8/1999 | A01F 12/305 |
| EP | 3072381 | A1 * | 9/2016 | A01D 61/008 |
| GB | 1151119 | A | 5/1969 | |

* cited by examiner

AUGER WITH RETRACTABLE FINGERS AT COMBINE FEEDER

BACKGROUND

The disclosure relates generally to an auger for a header for use with combine harvesters. In particular, the auger includes retractable fingers adjacent a combine feeder.

An agricultural combine is a machine used to harvest a variety of crops from a field. During a harvesting operation, a corn header at the front of the combine cuts ripened crop from the field. Row dividers of a corn header (i.e., a type of header) directs row of corn stalks to ear separation chambers or stripping plates and then to an auger. The auger advance the crop towards the vehicle centerline (e.g., near an inlet for the combine feeder). A feederhouse transfers the crop material into the combine by way of a conveyor such as an elevator assembly. Processing machinery such as threshing and separating assemblies within the combine further separate, clean and/or transfer the grain for storage.

During harvesting, crop feeding at high throughput rates results in material other than grain (MOG) bunching directly in front of the combine feeder that resists transfer from the header to the combine. This causes the operator either to slow down or stop harvesting altogether if the MOG becomes a plug that stops feeding into the combine feeder. Therefore, there is a need for a header that minimizes or avoids the buildup of MOG in front of the combine feeder.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a header of a combine harvester is provided. The header includes an auger for directing a movement of harvested crop material toward a feederhouse of the combine harvester. The auger includes multiple protrusions configured to both extend from and retract into the auger during rotation of the auger to assist movement of the harvested crop material toward the feederhouse.

In another embodiment, a header of a combine harvester is provided. The header includes an auger for directing a movement of harvested crop material toward a feederhouse of the combine harvester. The auger includes a first auger section and a second auger section, the first auger section includes a first end, the second auger section includes a second end, the first and second ends abut each other in a colinear arrangement to form the auger. The first auger section includes a first set of protrusions adjacent the first end, the second auger section includes a second set of protrusions adjacent the second end, and the first and second sets of protrusions are configured to both extend from and retract into the auger during rotation of the auger to assist movement of the harvested crop material toward the feederhouse.

In a further embodiment, a combine harvester is provided. The combine harvester includes a feederhouse including an inlet for receiving harvested crop material. The combine harvester also includes an auger for directing a movement of harvested crop material toward the inlet of the feederhouse of the combine harvester. The auger includes multiple protrusions configured to both extend from and retract into the auger during rotation of the auger to assist movement of the harvested crop material toward the inlet of the feederhouse.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
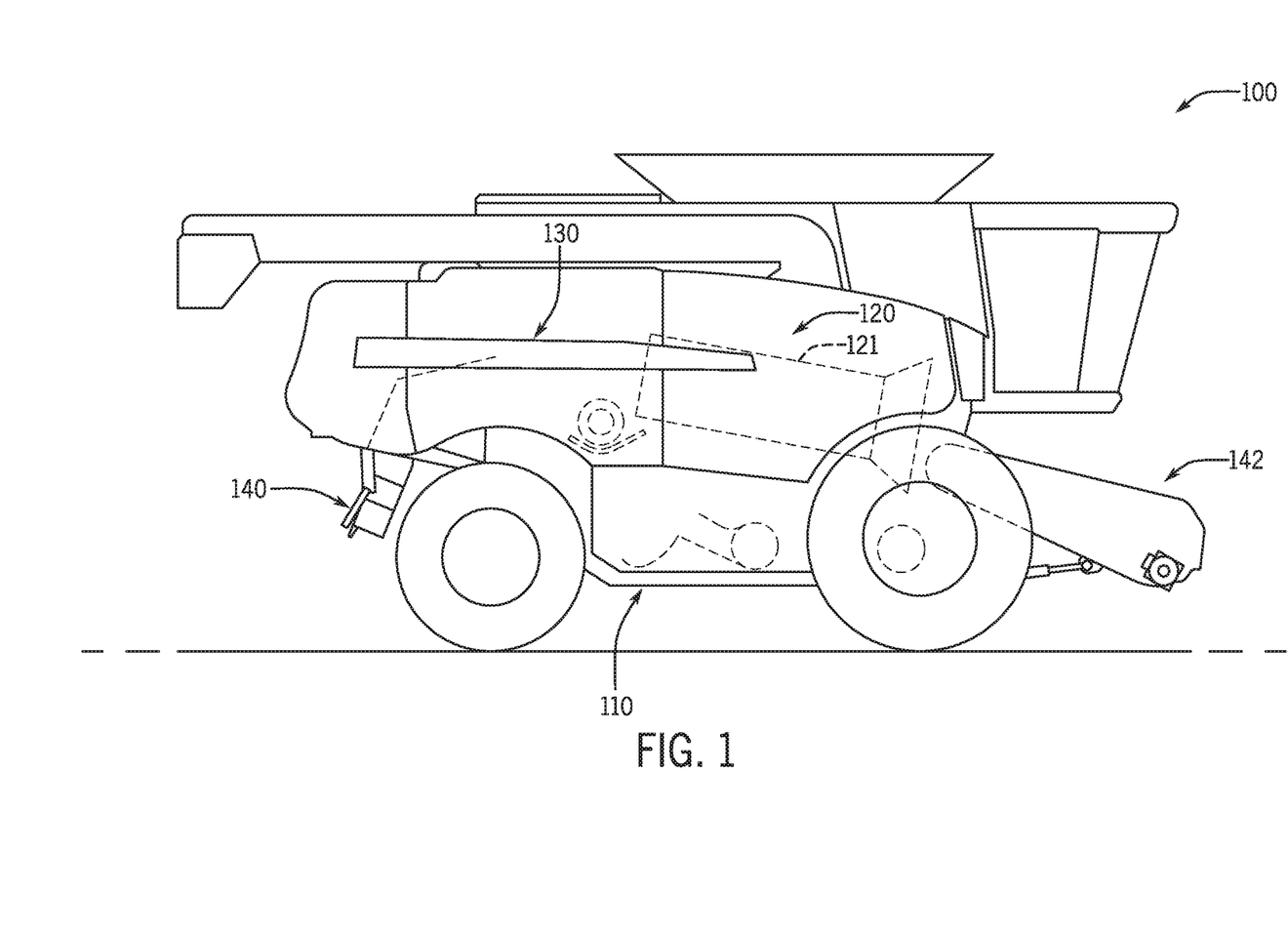
FIG. 1 is a side view of an embodiment of an agricultural harvester having a header of the present disclosure.

FIG. 1 shows an agricultural combine 100 (e.g., combine harvester), which includes a chassis 110 carrying the usual harvesting apparatus (not all of which is shown). As described in greater detail below, the agricultural combine 100 includes a header 112 (e.g., corn header) that includes an auger having retractable protrusions (e.g., finger-shaped protrusions or tines) that help actively direct movement of a harvested crop material (e.g., corn and MOG) towards an inlet of a feederhouse 142 of the agricultural combine 100.

The agricultural combine 100 includes an axially oriented crop processing system 120 that receives harvested crop. In addition, the agricultural combine 100 includes a crop residue handling system 130 with a crop residue spreading system 140 positioned at the aft end of the combine 100. The crop processing system includes a cylindrical threshing rotor 121 that conveys a flow of crop material in a helical flow path. As the crop material is moved through the processing apparatus 120, the desired crop such as grain or other material is loosened and separated from crop residue such as husk and pods in a cleaning system located beneath the threshing rotor 121.

Figure 2:
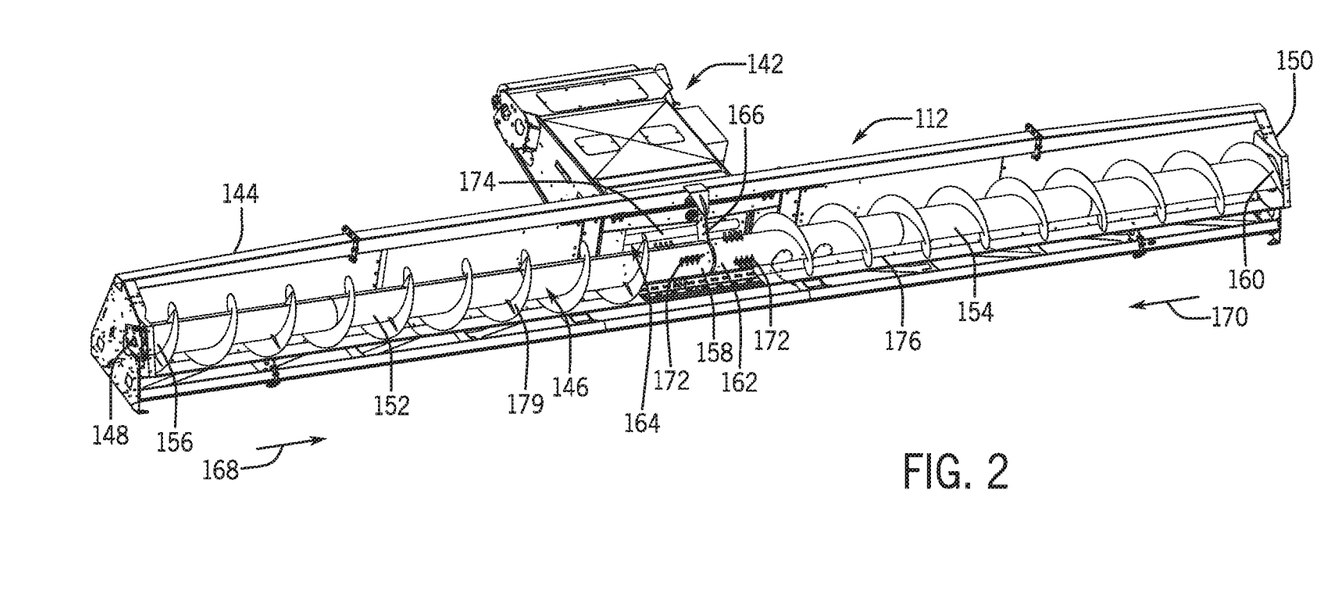
FIG. 2 is a top perspective view of an embodiment of a header (e.g., corn header) coupled to a feederhouse for the agricultural harvester of FIG. 1.

FIG. 2 is a top perspective view of an embodiment of the header 112 (e.g., corn header) coupled to a feederhouse 142 for the agricultural harvester of FIG. 1. It should be noted that not all components of the header 112 are shown (e.g., row divider, row unit, etc.). The header 112 includes a frame 144 coupled to the feederhouse 142. The header 112 also includes an auger 146 that extends lengthwise across the frame 144 between side portions 148, 150 of the frame 144. The auger 146 includes a first auger section 152 and a second auger section 154 that are separate from each other. The first auger section 152 includes ends 156 and 158. The second auger section 154 includes ends 160 and 162. The ends 156, 160 are coupled to the side portions 148, 150, respectively, of the frame 144. The ends 158, 162 are coupled to the frame 144 adjacent an inlet 164 of the feederhouse 142 via supports 166. The ends 158, 162 abut each other in a collinear arrangement to form the auger 146. The auger 146 directs movement of the harvested crop material toward the inlet 164 of the feederhouse 142. The first auger section 152 is configured to flight the harvested crop material in a direction 168 extending from the end 156 toward the end 158. The second auger section 154 is configured to flight the harvested crop material in a direction 170 from the end 160 toward the end 162.

As described in greater detail below, the auger 146 on each section 152, 154 adjacent respective ends 158, 162 (and adjacent the inlet 164 of the feederhouse 142) includes a plurality of protrusions 172 configured to both extend from the auger 146 and to retract within the auger 146 during rotation of the auger 146 to assist movement of the harvested crop material toward the inlet 164 of the feederhouse 142. In particular, the protrusions 172 begin to retract as the protrusions 172 approach the inlet 164. The protrusions 172 are fully retracted in front of a feeder drum 174 of the feederhouse 142 to minimize the amount of crop material that is carried over the auger 146. As the protrusions 172 pass the feeder drum 174 and encounter the header floor 176 (e.g., auger trough), the protrusions 172 begin to extend. In the fully extended position, the protrusions 172 grab the crop material and work similar to a rake. The protrusions 172 create pressure toward the feeder while reducing recirculation of material away from the feeder to minimize or avoid buildup of MOG in front the inlet 164. The timing of the extension and retraction of the protrusions 172 is adjustable as described in greater detail below.

Figure 3:
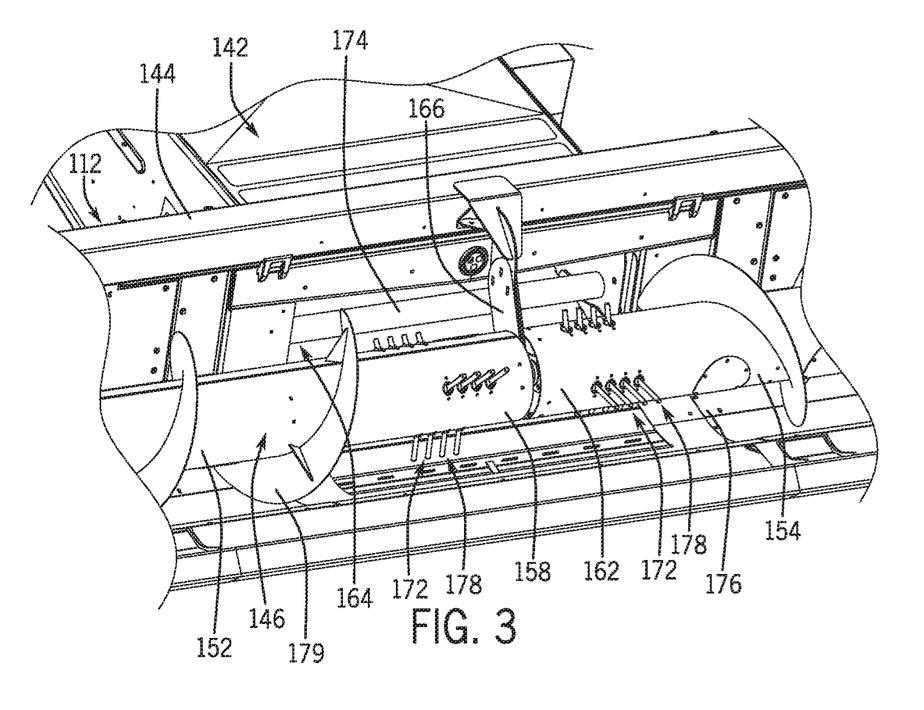
FIG. 3 is a top perspective view of a portion of the header coupled to the feederhouse in FIG. 2.
Figure 4:
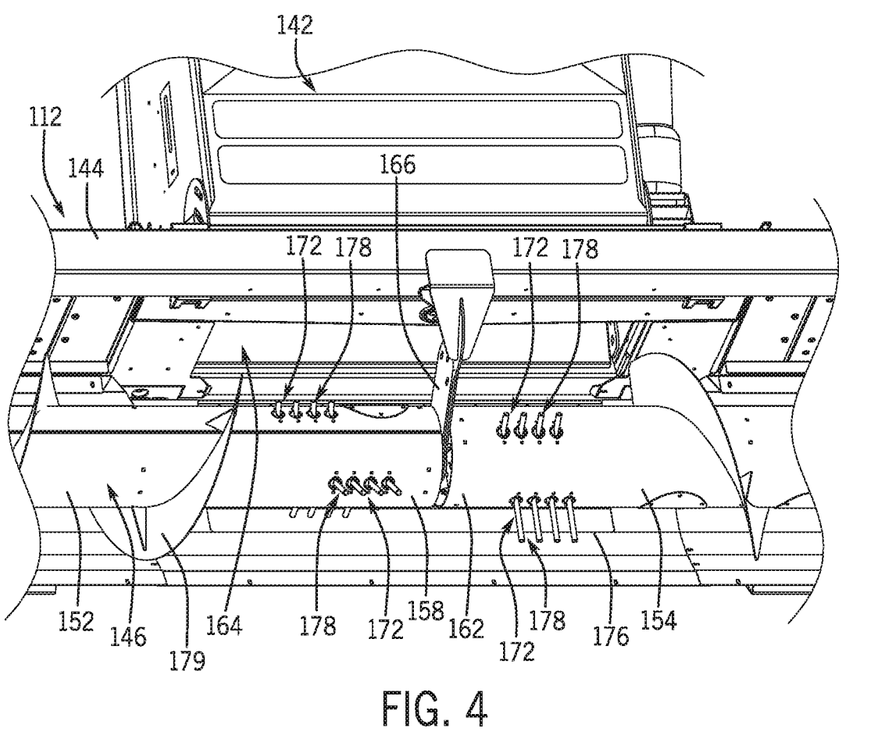
FIG. 4 is a top perspective view of a portion of the header coupled to the feederhouse in FIG. 2.

FIGS. 3 and 4 are top perspective views of a portion of the header 112 coupled to the feederhouse 142 in FIG. 2. Each end 158, 162 includes multiple sets 178 of protrusions 172. Each set 178 includes at least two protrusions 172 (e.g., 2, 3, 4, 5, or more protrusions 172). As depicted in FIGS. 3 and 4, each set 178 includes 4 protrusions 172. As depicted, each end 158, 162 includes 4 sets 178 of protrusions 172 evenly space apart circumferentially about the auger 146. The number of sets 178 on each end 158, 162 may vary (e.g., 2, 3, 4, 5, or more sets). Each set 178 is spaced apart circumferentially about the auger 146 from an adjacent set 178 by approximately 90 degrees.

Figure 5:
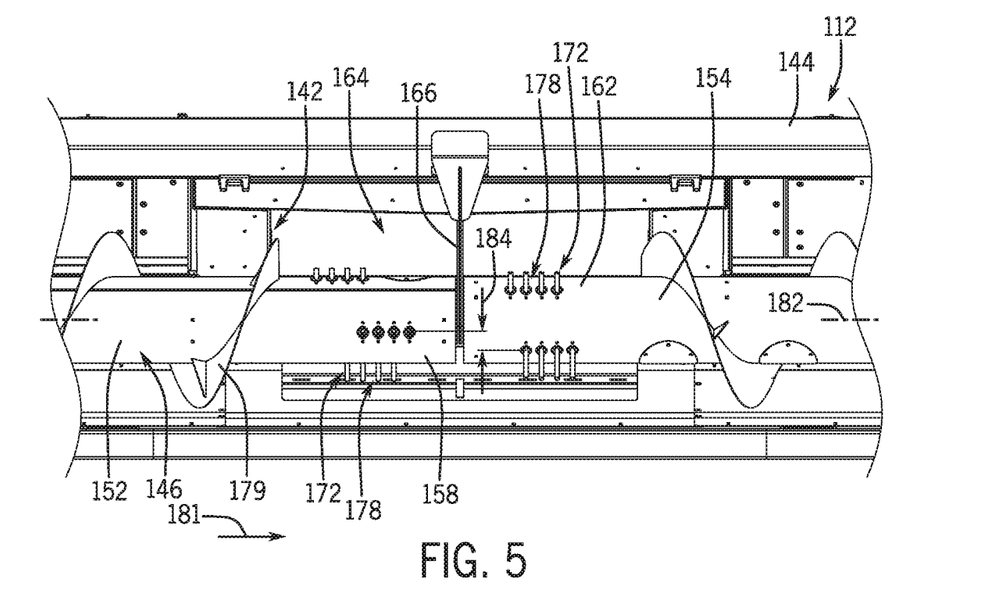
FIG. 5 is a front view of the header coupled to the feederhouse in FIG. 2 (e.g., having a row unit coupled to the header)

FIG. 5 is a front view of the header 112 coupled to the feederhouse 142 in FIG. 2. As depicted in FIG. 5, the sets 178 of protrusions 172 on each respective end 158, 162 are partially offset from each other in an axial direction 181 along a longitudinal axis 182 of the auger 146 and a circumferential direction about the auger 146 to form a staggered arrangement. In particular, the sets 178 of protrusions 172 on each respective end 158, 162 are arranged to follow the path (e.g., spiral path) of the crop material about the auger 146. The sets 178 of protrusions 172 adjacent the end 158 are staggered (i.e., not axially aligned along the longitudinal axis 182) from the sets 178 of protrusions 172 adjacent the end 162 as indicated by offset 184. As depicted in FIGS. 2-5 (as well as FIG. 2), the flighting 179 of the auger 146 ends upstream of the protrusions 172 (e.g., adjacent the outer edge of the inlet 164). In certain embodiments, the fighting 179 may end at or upstream of the inlet 164. In certain embodiments, the fighting 179 may continue to the ends 158, 162 of the auger 146.

Figure 6:
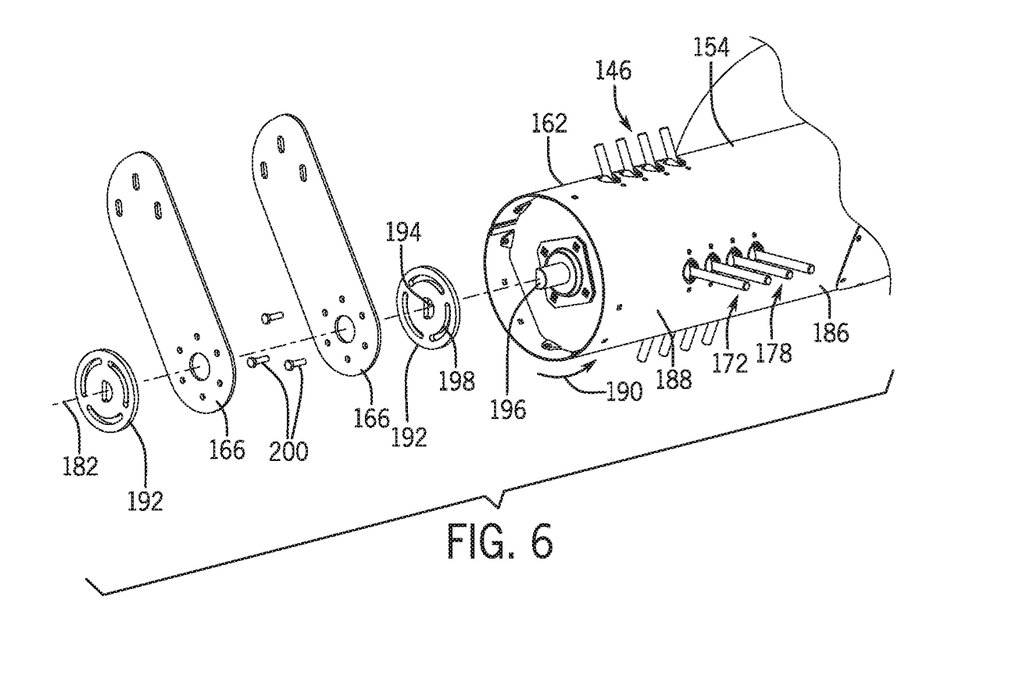
FIG. 6 is a perspective view of an embodiment of an auger end.

FIG. 6 is a perspective view of the end 162 of the auger 146. The following description of end 162 also applies to end 158 of the auger 146. Disposed within the auger 146 is an auger crankshaft 186 that is coupled to each set 178 of protrusions 172 (via a respective coupler 188 or T-shaped block). The crankshaft 186 acts as part of a cam mechanism to extend and retract the protrusions 172 as it rotates circumferentially 190 about the longitudinal axis 182. The timing of the extension and retraction of the protrusions 172 is adjustable. In particular, the timing is determined via a plate 192 disposed between the end 162 and the support 166. The structure of the plate 192 may vary. As depicted, the plate 192 includes a D-shaped opening 194 to receive a post 196 (e.g., coupled to the crankshaft 186) having a D-shaped cross section. The plate 192 also includes slots 198 (e.g., 3 slots) that interact with respective protrusions 200 extending from the support 166. In certain embodiments, the set 178 of protrusions 172 may fully extend or fully retract within approximately 90 degrees of rotation about the longitudinal axis 182. In certain embodiments, the set of protrusions 172 may fully extend or fully retract within approximately 180 degrees of rotation about the longitudinal axis 182.

Figure 7:
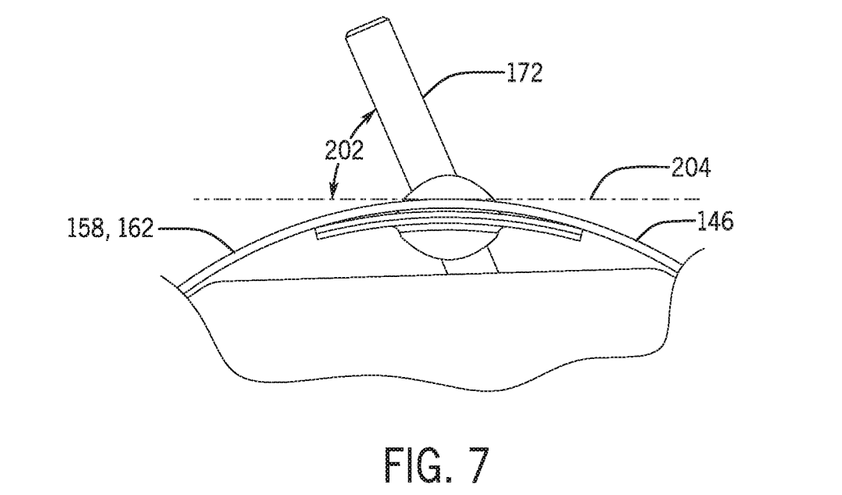
FIG. 7 is a schematic end view of a portion of an embodiment of an auger end.

FIG. 7 is a schematic end view of the end 158, 162 of the auger 146. As depicted in FIG. 7, each protrusion 172 may extend from the auger 146 at an angle 202 relative to a tangent 204 of a circumference of the auger 146. In certain embodiments, the angle 202 is less than, equal to or greater than 90 degrees (e.g., as depicted in FIG. 7). For example, the angle 202 may range between 30 and less than 150 degrees. For example, the angle 202 may be 30, 35, 40, 45, 50, 55, 60, 65, 70, 75, 85, 90, 95, 100, 105, 115, 120, 125, 130, 135, 140, 145 or any other angle therebetween.

Figure 8:
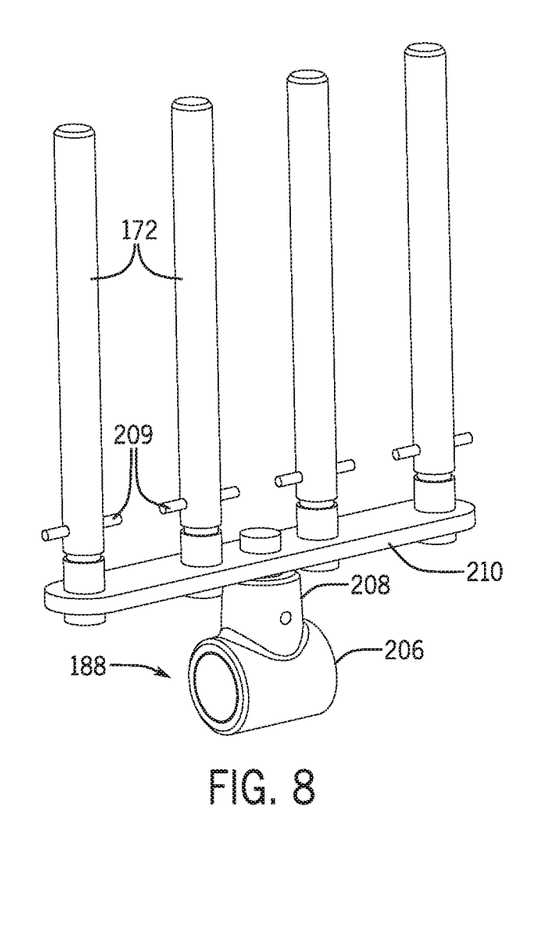
FIG. 8 is a perspective view of multiple protrusions coupled to a coupler.
Figure 9:
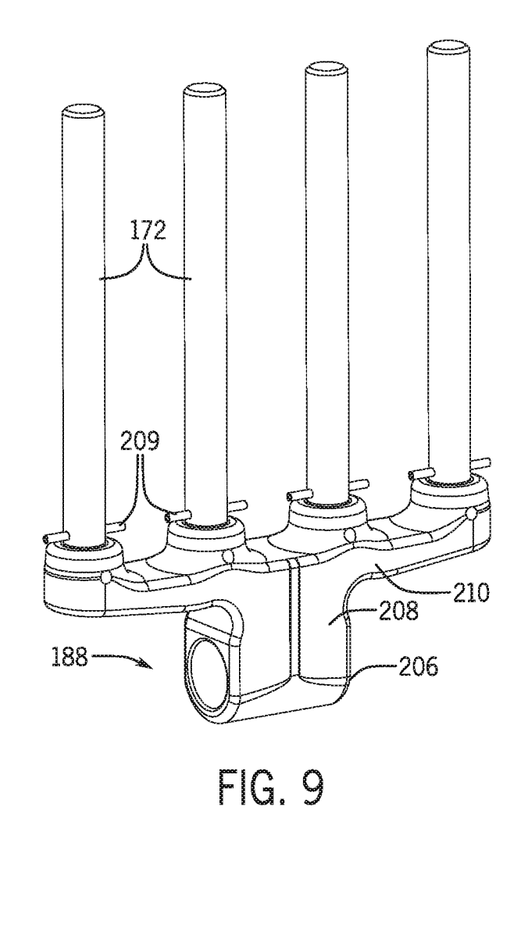
FIG. 9 is a perspective view of multiple protrusions coupled to a coupler.
Figure 10:
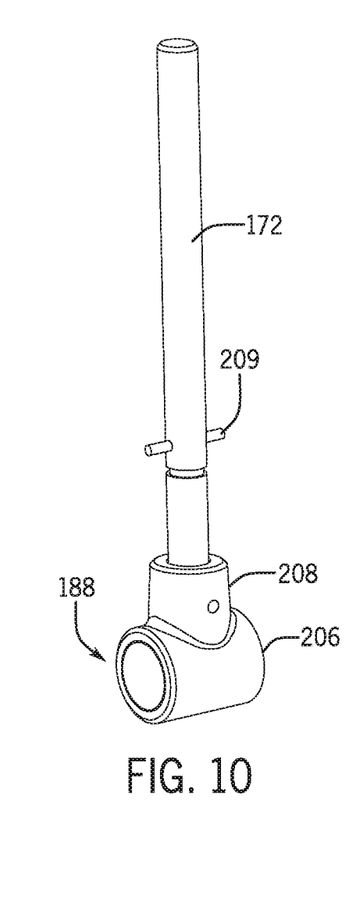
FIG. 10 is a perspective view of multiple protrusions coupled to a coupler (e.g., having a base and coupler forming a single body).

FIGS. 8-10 are perspective views of protrusions 172 coupled to the coupler 188 (e.g., T-block). The coupler 188 includes a first portion 206 configured to be disposed about the auger crankshaft 186 and a second portion 208 configured to be coupled to one or more protrusions 172 directly or indirectly. The protrusions 172 are coupled to the couplers 188 via fasteners 209 (e.g., pins). As depicted in FIG. 8 (and similarly depicted in FIG. 6), the second portion 208 of the coupler 188 is coupled to a base portion 210 (which extends parallel to the first portion 206). Multiple protrusions 172 (e.g., 4) are coupled to the base portion 210 in FIG. 8. In certain embodiments, as depicted in FIG. 9, the base portion 210 forms a single piece with the coupler 188. In certain embodiments, as depicted in FIG. 10, the coupler 188 is coupled to a single protrusion 172.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An auger that directs movement of harvested crop material toward a feederhouse of a combine harvester, the auger comprising:
an auger section; and
a plurality of protrusions that both extend from and retract into the auger section during rotation of the auger section assisting movement of the harvested crop material toward the feederhouse;
wherein the plurality of protrusions comprises a plurality of sets of protrusions circumferentially spaced apart from each other about the auger section relative to a longitudinal axis of the auger section, each set of protrusions comprises a same number of multiple protrusions, and wherein the plurality of sets of protrusions are partially offset from each other in an axial direction along the longitudinal axis of the auger section, and at least one set of protrusions partially overlaps with another set of protrusions in a circumferential direction relative to the longitudinal axis, and each set of protrusions is located at a different circumferential location so as not to be aligned in the axial direction with any other protrusions on the auger section.

2. The auger of claim 1, wherein the plurality of protrusions is disposed in the auger section adjacent an inlet of the feederhouse.

3. The auger of claim 1, wherein each protrusion of the plurality of protrusions comprises a finger-like shape.

4. The auger of claim 1, wherein each protrusion of the plurality of protrusions retracts into the auger section as the plurality of protrusions approach an inlet of the feederhouse during rotation of the auger section.

5. The auger of claim 1, wherein each protrusion of the plurality of protrusions extends from the auger section after the plurality of protrusions pass an inlet of the feederhouse during rotation of the auger section.

6. The auger of claim 1, wherein each set of protrusions comprises at least two protrusions.

7. The auger of claim 1, wherein each set of protrusions is circumferentially spaced apart from an adjacent set of protrusions by 90 degrees.

8. The auger of claim 1, wherein:
the auger section is a first auger section,
the auger further comprises a second auger section physically separate from the first auger section,
the first auger section comprises a first end and a second end,
the second auger section comprises a third end and a fourth end,
the first and third ends abut each other in a colinear arrangement,
the first auger section comprises at least one set of protrusions adjacent the first end and a first fighting extending along the first auger section from adjacent the second end and stopping upstream of all protrusions on the first auger section, and
the second auger section comprises at least one set of protrusions adjacent the third end and a second fighting extending along the second auger section from adjacent the fourth end and stopping upstream of all protrusions on the second auger section.

9. The auger of claim 8, wherein the first auger section comprises four sets of protrusions adjacent the first end and circumferentially spaced apart from each other about the first auger section, and the second auger section comprises four sets of protrusions adjacent the third end and circumferentially spaced apart from each other about the second auger section.

10. The auger of claim 9, wherein the four sets of protrusions adjacent the first end are circumferentially staggered from the four sets of protrusions adjacent the third end.

11. The auger of claim 1, comprising a plate coupled to a first end of the auger section adjacent the plurality of protrusions, wherein the plate comprises slots that determine a timing of the extension and the retraction of the plurality of protrusions.

12. The auger of claim 1, wherein each set of protrusions of the plurality of sets of protrusions comprises the multiple protrusions coupled to a single base portion coupled to a coupling portion disposed about an auger crankshaft within the auger section.

13. An auger that directs movement of harvested crop material toward a feederhouse of a combine harvester, the auger comprising:
a first auger comprising a first end and a second end and a first set of protrusions adjacent the first end, wherein the first auger comprises a first flighting extending along the first auger from adjacent the second end and stopping upstream of the feederhouse and all protrusions on the first auger, the first flighting being the only flighting on the first auger; and
a second auger comprising a third end and a fourth end and a second set of protrusions adjacent the third end, wherein the second auger comprises a second flighting extending along the second auger from adjacent the fourth end and stopping upstream of the feederhouse and all protrusions on the second auger, the second flighting being the only fighting on the second auger, and wherein the first auger and the second auger are physically separate from each other,
wherein the first and third ends abut each other in a colinear arrangement,
wherein the first and second sets of protrusions both extend from and retract into the first and second augers, respectively, during rotation of the first and second augers assisting movement of the harvested crop material toward the feederhouse, and the first set of protrusions and the second set of protrusions each comprises multiple protrusions axially aligned with each other relative to a longitudinal axis of the auger.

14. The auger of claim 13, wherein the first auger comprises four sets of protrusions adjacent the first end and circumferentially spaced apart from each other about the first auger, and the second auger comprises four sets of protrusions adjacent the second end and circumferentially spaced apart from each other about the second auger.

15. The auger of claim 14, wherein each set of the four sets of protrusions adjacent the first end are circumferentially spaced apart from adjacent sets of protrusions by 90 degrees, and each set of the four sets of protrusions adjacent the second end are circumferentially spaced apart from adjacent sets of protrusions by 90 degrees.

16. The auger of claim 13, wherein the first set of protrusions and the second sets of protrusions each comprises the multiple protrusions coupled to a single base portion coupled to a coupling portion disposed about a respective auger crankshaft within the first auger and the second auger, respectively.

17. A combine harvester, comprising:
a feederhouse comprising an inlet that receives harvested crop material; and
an auger that directs movement of the harvested crop material toward the inlet of the feederhouse during rotation of the auger, wherein the auger comprises a plurality of protrusions that both extend from and retract into the auger during rotation of the auger assisting movement of the harvested crop material toward the inlet of the feederhouse;
wherein the plurality of protrusions comprises a plurality of sets of protrusions circumferentially spaced apart from each other about the auger relative to a longitudinal axis of the auger, each set of protrusions comprises a same number of multiple protrusions, and wherein the plurality of sets of protrusions are partially offset from each other in an axial direction along the longitudinal axis of the auger, and at least one set of protrusions partially overlaps with another set of protrusions in a circumferential direction relative to the longitudinal axis, and each set of protrusions is located at a different circumferential location so as not to be aligned in the axial direction with any other protrusions on the auger.

18. The combine harvester of claim 17, wherein each protrusion of the plurality of protrusions retracts into the auger as the plurality of protrusions approach the inlet of the feederhouse during rotation of the auger, and each protrusion of the plurality of protrusions extends from the auger after the plurality of protrusions pass the inlet of the feederhouse during rotation of the auger.

19. The combine harvester of claim 17, wherein each set of protrusions of the plurality of sets of protrusions comprises the multiple protrusions coupled to a single base portion coupled to a coupling portion disposed about an auger crankshaft within the auger.

* * * * *